US012363142B1

(12) United States Patent
Jaisinghani et al.

(10) Patent No.: US 12,363,142 B1
(45) Date of Patent: Jul. 15, 2025

(54) REROUTING SUSPICIOUS WEB TRAFFIC

(71) Applicant: Bolt Financial, Inc., San Francisco, CA (US)

(72) Inventors: Gaurav Narayan Jaisinghani, Los Angeles, CA (US); Marshall Maynard Jaquish, Loomis, CA (US)

(73) Assignee: Bolt Financial, Inc., San Francisco, CA (US)

( * ) Notice: Subject to any disclaimer, the term of this patent is extended or adjusted under 35 U.S.C. 154(b) by 302 days.

(21) Appl. No.: 17/940,557

(22) Filed: Sep. 8, 2022

(51) Int. Cl.
*H04L 9/40* (2022.01)
*G06F 21/53* (2013.01)

(52) U.S. Cl.
CPC .......... *H04L 63/1416* (2013.01); *G06F 21/53* (2013.01); *H04L 63/20* (2013.01)

(58) Field of Classification Search
CPC . H04L 63/1441; H04L 63/1433; H04L 43/16; H04L 63/1408; H04L 63/1491; H04L 51/212; H04L 43/065; H04L 41/5009; H04L 41/5019; H04L 63/1483; H04L 63/0227; H04L 63/14; H04L 41/0213; H04L 43/026; H04L 43/062; H04L 43/10; H04L 43/50; H04L 63/123; H04L 63/1416; H04L 63/1425; H04L 63/145; H04L 63/1466; H04L 63/168; H04L 67/10; H04L 12/1813; H04L 2463/121; H04L 2463/144; H04L 41/16; H04L 41/40; H04L 41/5054; H04L 51/00; H04L 63/0245; H04L 63/08; H04L 63/101; H04L 63/126; H04L 67/025; G06F 21/554; G06F 21/54; G06F 21/552; G06F 2221/034; G06F 21/57; G06F 2221/2115; G06F 2221/2127; G06F 2221/2139; G06F 16/951; G06F 21/53; G06F 21/566
See application file for complete search history.

(56) References Cited

U.S. PATENT DOCUMENTS

| | | | |
|---|---|---|---|
| 8,903,920 B1* | 12/2014 | Hodgson | G06F 21/56 709/206 |
| 2009/0003364 A1* | 1/2009 | Fendick | H04L 45/60 370/401 |
| 2014/0040979 A1* | 2/2014 | Barton | H04W 12/30 726/1 |

(Continued)

*Primary Examiner* — Chris Parry
*Assistant Examiner* — Abderrahmen Chouat
(74) *Attorney, Agent, or Firm* — Baker Botts L.L.P.

(57) ABSTRACT

In one embodiment, a method includes receiving a first request message associated with the online application, where the online application is provided by one or more application servers within the network domain, where the online application manages data, determining that a first suspicion score associated with the first request message exceeds a pre-determined threshold, inserting an indication into the first request message in response to the determination, where the indication specifies that the first request message is to be routed to a sandbox environment that is configured to mimic the one or more application servers, and where the sandbox environment is configured to not update the data managed by the online application, determining first routing policies based at least on the first suspicion score, and forwarding the indication-inserted first request message to a first computing device in the network domain based on the first routing policies.

20 Claims, 8 Drawing Sheets

(56) References Cited

U.S. PATENT DOCUMENTS

2018/0020024 A1\* 1/2018 Chao .................. H04L 63/1425
2019/0065725 A1\* 2/2019 Liderman ............... G06F 21/33
2019/0386924 A1\* 12/2019 Srinivasan ............ H04L 47/115

\* cited by examiner

REROUTING SUSPICIOUS WEB TRAFFIC

TECHNICAL FIELD

This disclosure generally relates to network security, and in particular, related to network security for online applications.

BACKGROUND

Unlike traditional software programs that run locally and natively on the operating system on the device, a web application is an application software that runs in a web browser. Web applications are delivered on the World Wide Web to users with an active network connection. Security breaches on web applications are a major concern because a web application may involve both enterprise information and private customer data. Protecting these assets is an important part of any web application.

A web application may operate on a client device associated with a user. The web application may rely on a web browser executing on the client device to interact with server-side components of the web application. The server-side components can include modules for handling features such as communication and user interactions, business logic, and data-handling. Corresponding modules may also operate on the client device to facilitate the server-side operations. However, the business logic, and potentially sensitive data, are made available to users, both ordinary and with malicious intent, as part of the necessary operations of most web applications. Because of the availability of this data, web applications can appear to be an enticing and easy-to-access target for hackers.

SUMMARY OF PARTICULAR EMBODIMENTS

Particular embodiments described herein relate to systems and methods for re-routing suspicious traffic for an online application to a "sandbox" environment. The sandbox environment is configured to mimic application servers, but not to update actual, "live" data managed by the online application. Preventing malicious web traffic from negatively impacting computer systems is an important objective in information security. Although detection mechanisms to identify hazardous web traffic have steadily advanced, the response for such detections has largely remained limited to blocking the traffic through the use of firewalls or similar network components. Blocking the suspicious traffic has limited benefit because the blocking is near-immediately observable to the attacker. The attacker may be able to overcome the blocking with trivial effort through simple changes such as changing an Internet Protocol (IP) address or deleting cookies from the messages. Furthermore, the short-lived benefit of blocking the traffic is accompanied by a dangerous side-effect: the near-instant feedback may provide helpful data to the attackers, who then may be able to evolve and improve their attack strategy through continual iteration. Rerouting suspicious traffic to a sandbox environment without the traffic source's knowledge is proposed to address the issues associated with the blocking solution.

Rerouting suspicious traffic to a sandbox environment without the traffic source's knowledge may yield a number of benefits. First, production-level information systems and processes may be protected from the attacker's behavior. Second, an attacker is required to expend considerably more resources per each attack attempt because the attacker is no longer receiving reliable feedback. Rather than being blocked, an attacker may be allowed to progress through a lengthy process and even receive false feedback that an attack was successful. The attacker may realize at a much later time that the outcome of the attack was not successful. Rerouting strategy may increase the amount of effort required to engineer a successful attack by several orders of magnitude as the attacker realizes failure in minutes, hours, or days instead of milliseconds.

In particular embodiments, a logical entity in a network domain associated with an online application may receive a first request message associated with the online application from a client device. The online application may be provided by one or more application servers within the network domain. The online application may manage data corresponding to one or more users. In particular embodiments, the logical entity may execute on a network device in the network domain. The network device may be a firewall, a gateway, a traffic load-balancer, or any suitable network device in the network domain. In particular embodiments, the logical entity may execute on one or more of the application servers.

In particular embodiments, the first request message may comprise state information associated with previous interactions between the one or more application servers and the client device. In particular embodiments, the state information may comprise one or more cookies in the first request message. In particular embodiments, the logical entity may determine that a first suspicion score associated with the first request message exceeds a pre-determined threshold. The first suspicion score may be calculated by a security engine. In particular embodiments, the security engine may execute on a device that the logical entity executes on. In particular embodiments, the security engine may execute on a different device in the network domain from a device that the logical entity executes on. In particular embodiments, the security engine may be executed by a third-party device and may be accessible through a call to an application programming interface provided by the third-party device. In particular embodiments, the logical entity may receive a confirmation on the calculated suspicion score from a security administrator before determining that the first suspicion score associated with the first request message exceeds the pre-determined threshold. In particular embodiments, the first suspicion score may be calculated based on one or more features associated with the first request message. The one or more features may comprise a source IP address associated with the client device, a geolocation information associated with the source IP address, traffic histories associated with the client device, a reaction time corresponding to the first request message in response to a previous message from the one or more application servers to the client device, or any suitable feature. In particular embodiments, the first suspicion score may be calculated with a trained machine-learning model. In particular embodiments, the trained machine-learning model may be further trained with the first request message and the suspicion score that is confirmed from the security administrator.

In particular embodiments, the logical entity may insert an indication into the first request message when the first suspicion score is determined to exceed the pre-determined threshold. In particular embodiments, the indication may be a tag inserted into a header of the first request message. The indication may specify that the first request message is to be routed to a sandbox environment that is configured to mimic the one or more application servers. The sandbox environment is configured to not update the data managed by the online application. In particular embodiments, the sandbox environment may comprise one or more computing devices. In particular embodiments, the sandbox environment may comprise one or more virtual machines. In particular embodiments, the logical entity may determine first routing policies based at least on the first suspicion score. The first routing policies may indicate the sandbox environment as the destination for the indication-inserted first request message. In particular embodiments, the logical entity may forward the indication-inserted first request message to a first computing device in the network domain based on the first routing policies. In particular embodiments, the first computing device may be one of the one or more application servers. The one of the one or more application servers may process the first request message before forwarding the first request message to the sandbox environment. The one of the one or more application servers may determine to forward the first request message to the sandbox environment based on the indication in the first request message. In particular embodiments, the first computing device may belong to the sandbox environment.

In particular embodiments, the logical entity may receive a second request message associated with the online application from the client device. In particular embodiments, the logical entity may determine that a second suspicion score associated with the second request message is lower than the pre-determined threshold. In particular embodiments, the logical entity may determine second routing policies based on the second suspicion score. The second routing policies may indicate that the second request message is to be routed to one of the one or more application servers. The logical entity may forward the second request message to a second computing device in the network domain based on the second routing policies.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments described herein relate to systems and methods for re-routing suspicious traffic for an online application to a sandbox environment that is configured to mimic application servers, but not to update data managed by the online application. Preventing malicious web traffic from negatively impacting computer systems is an important objective in information security. Although detection mechanisms to identify hazardous web traffic have been proposed, the response for such detections has largely remained limited to blocking the traffic through the use of firewalls or similar network components. Blocking suspicious traffic has limited benefit because the blocking is near-immediately observable to the attacker. The attacker may be able to overcome the blocking with trivial effort through simple changes such as changing an Internet Protocol (IP) address or deleting cookies from the messages. Furthermore, the short-lived benefit of blocking the traffic is accompanied by a dangerous side-effect: the near-instant feedback may provide helpful data to the attackers, who then may be able to evolve and optimize their attack strategy through continual iteration.

Rerouting suspicious traffic to a sandbox environment without the traffic source's knowledge is proposed to address the issues associated with a blocking-based solution. Rerouting suspicious traffic to a sandbox environment without the traffic source's knowledge may yield a number of benefits. First, production-level information systems and processes may be protected from the attacker's behavior, in much the same way that blocking protects the same systems. As an improvement over blocking-based solutions, the production-level information systems and processes may be protected for additional time correlating to the amount of time that the attacker believes that they are engaging with a production-level system but are in fact interacting with the sandbox environment. Second, an attacker is required to expend considerably more resources per each attack attempt because the attacker is no longer receiving reliable feedback. Rather than being blocked, an attacker may be allowed to progress through a lengthy process and even receive false feedback that an attack was successful. The attacker may realize at a much later time that the outcome of the attack was not successful. The rerouting strategy discussed herein may increase the amount of effort required to engineer a successful attack by several orders of magnitude as the attacker realizes failure in minutes, hours, or days instead of milliseconds.

Figure 1:
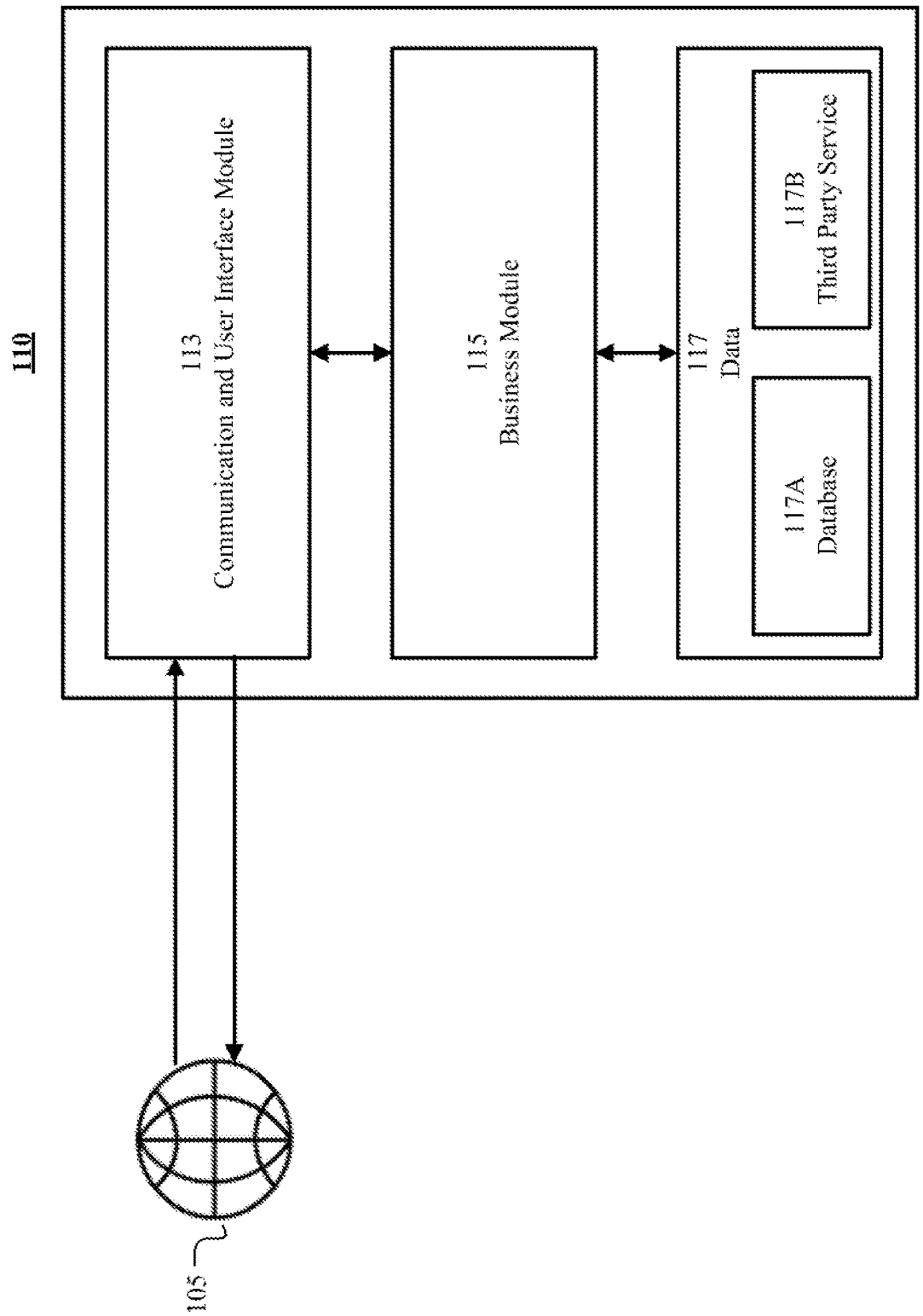
FIG. 1 illustrates an example logical architecture of a web application.

FIG. 1 illustrates an example logical architecture of a web application. A web browser 105 runs on a client device associated with a user. The web browser 105 may be a key component of a web application that interacts with the user, receives user input, and manages presentation logic while controlling user interactions with the application. A server-side web application 110 may comprise several modules, including a communication and user interface module 113, a business module 115, and data component 117. The communication and user interface module 113, mostly executing on a web server, may handle the communications with the web browser 105 and present information to the users by using images, HyperText Markup Language (HTML), JavaScript (JS), Cascading Style Sheets (CSS), Hypertext Preprocessor (PHP), or any suitable web technologies. The business module 115 may be the key component of the web application architecture that receives user requests, performs business logic, and delivers the required data to the communication and user interface module 113. The data component 117 may comprise one or more databases 117A and/or third-party services 117B. The database 117A may store and manage information for the web application. The business module 115 may search, filter, and sort information based on user requests and present the required information to the users. The business module 115 may also add or update information to the database 117A based on user requests. The third-party services 117B may provide similar services of the databases 117A through an application programming interface (API).

Figure 2:
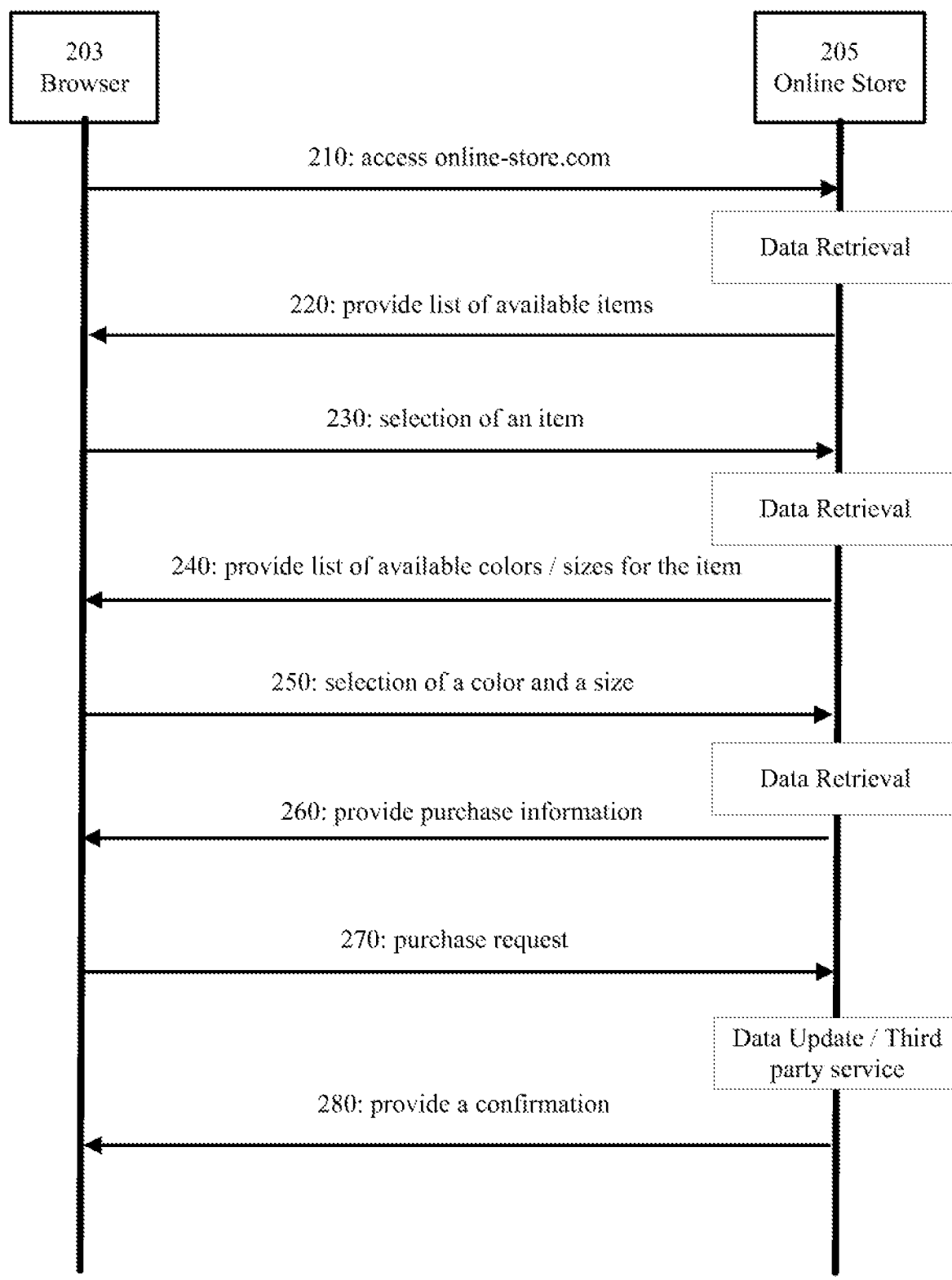
FIG. 2 illustrates an example message flow between a browser and an online application server.

FIG. 2 illustrates an example message flow between a browser 203 and an online application server 205. The messages are simplified for an illustration purpose. In reality, more or fewer messages may be exchanged between the browser 210 and the online application server 205 associated with an online store that sells clothes. The example message flow is provided, in part, to illustrate the variety of messages being exchanged between the browser 203 and the online application server 205 during the course of a standard user interaction. The data exchanged between the browser 203 and the online application server 205 can include non-sensitive information, sensitive or time-dependent business information, and sensitive user information such as a user's name, address, and financial information.

At step 210, the browser 203 may send an access request message to the online application server 205. The access request message may comprise user credentials for a user associated with the browser 203. The online application server 205 may retrieve available items from a database and provide information associated with the available items at step 220. The available items may comprise inventory information, such as t-shirts, hoodies, pants, jackets, or any suitable items available at the online store. The information associated with the available items may comprise images and descriptions associated with each of the available items. The browser 203 may present the information received at 220 to the user and receive a selection from the user.

The browser 203 may send the selection of an item at step 230. The online application server 205 may retrieve information regarding available colors and sizes for the selected item from the database. The online application server 205 may send a list of available colors and sizes for the selected items at step 240. The browser 203 may present the received list of available colors and sizes for the selected items to the user and receive a selection for a color and a size of the item.

At step 250, the browser 203 may send the selection of the color and size to the online application server 205. In particular embodiments, the message sent at step 250 may comprise cookies indicating the activity history, including the items the user has reviewed, the selected item, and other available activity history information. In particular embodiments, any message from the browser 203 to the online application server 205 may comprise cookies comprising state information, including the activity history. The online application server 205 may retrieve purchase information including price, available shipping date, and suitable purchase information from the database. The online application server 205 may send the purchase information to the browser 203 at step 260.

If the user decides to purchase the item, the browser 203 may send a purchase request message at step 270 to the online application server 205. The purchase request may comprise credit card information, shipping address, and contact information. Upon receiving the purchase request at step 270, the online application server 205 may create an order information record and update the purchase history records associated with the user on the database. In particular embodiments, the online application server 205 may access a third-party service to process the credit card transaction. When the credit card transaction is successfully processed, the online application server 205 may send a confirmation message to the browser at step 280. Although various examples described herein use the example of an online store web application, this disclosure contemplates the use of the techniques described herein with any manner of web application.

Figure 3:
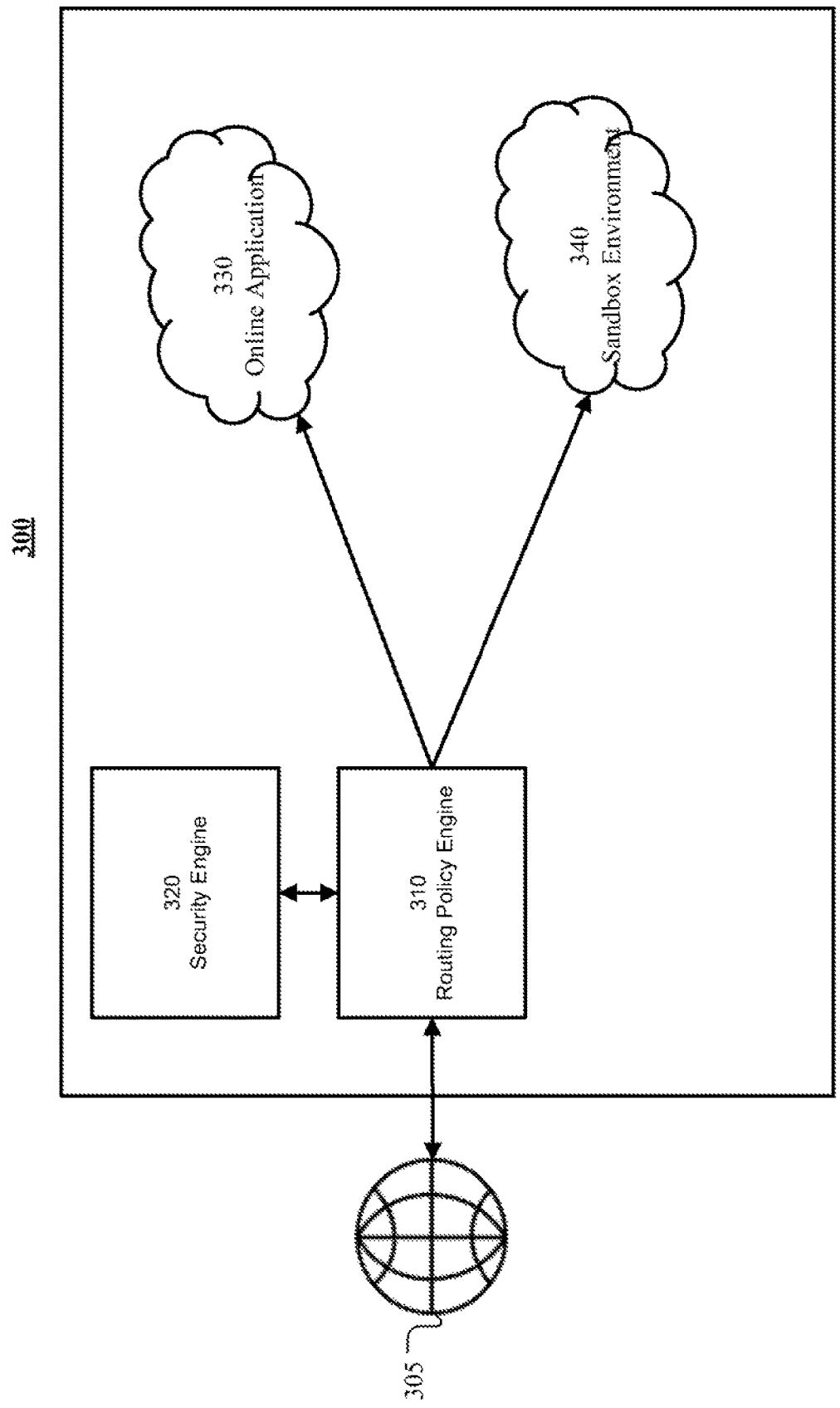
FIG. 3 illustrates an example logical architecture for rerouting suspicious traffic to a sandbox environment according to some embodiments described herein.

FIG. 3 illustrates an example logical architecture for rerouting suspicious traffic to a sandbox environment. In particular embodiments, a logical entity in a network domain associated with an online application may receive a request message associated with the online application from a client device. As in the example illustrated in FIG. 2, the request message can include a request to access a storefront of an online store or to retrieve a home page for a web application. The online application may be provided by one or more application servers within the network domain. The online application may manage data corresponding to one or more users. As an example and not by way of limitation, illustrated in FIG. 3, a routing policy engine 310, may receive a message from a browser 305 associated with a user. The routing policy engine 310 may comprise a software module, executing on any of available computing device within a network domain 300 associated with an online application 330, The browser 305 may execute on a client device associated with the user. The online application 330 may manage data. The data managed by the online application 330 may comprise data associated with business and data associated with one or more users. After evaluating the message from the browser 305, the routing policy engine 310 may determine a destination of the message. The destination may be the online application 330 or a sandbox environment 340. The sandbox environment 340 may be configured to mimic the online application 330, but not to update the data managed by the online application 330. Although this disclosure describes a logical entity that receives a message from a client device in a particular manner, this disclosure contemplates a logical entity that receive a message from a client device in any suitable manner.

In particular embodiments, the request message may be a first request message. The first request message may be the first interaction between the web browser 305 or the client device on which the web browser 305 is executing and the web application. The first request message may be the first interaction between the web browser 305 and the web application for a particular session. The first request message may comprise state information associated with previous interactions between the one or more application servers and the client device. In particular embodiments, the state information may comprise one or more cookies in the first request message. As an example and not by way of limitation, the first request message may be a selection of a color and size for a previous selected item as in step 250 in FIG. 2. The message may comprise one or more cookies indicating activity history between the browser 203 and the online application server 205. In particular embodiments, the state information may be delivered with any other available technologies other than cookies. Although this disclosure describes delivering state information associated with previous interactions between the online application server and the client device in a particular manner, this disclosure contemplates delivering state information associated with previous interactions between the online application server and the client device in any suitable manner.

In particular embodiments, the logical entity may use techniques to evaluate a risk associated with a request, or, whether a request should be routed to the online application 330 or to a sandbox environment 340. The logical entity may determine that a first suspicion score associated with the first request message exceeds a pre-determined threshold. The first suspicion score may be calculated by a security engine 320. As an example and not by way of limitation, continuing with a prior example illustrated in FIG. 3, the routing policy engine 310 may determine a first suspicion score associated with the first message by communicating with a security engine 320. In particular embodiments, the routing policy engine 310 may provide the first message along with additional available information associated with the first message to the security engine 320. The routing policy engine 310 may receive the first suspicion score from the security engine 320 as a response. In particular embodiments, the routing policy engine 310 may use API defined for the security engine to communicate with the security engine 320. In particular embodiments, the routing policy engine 310 may use any available inter process communication (IPC) mechanism to communicate with the security engine 320. The routing policy engine 310 may determine that the first suspicion score received from the security engine 320 exceeds the pre-determined threshold. As another example and not by way of limitation, the first suspicion score may indicate a degree of trustworthiness. In such a scenario, routing policy engine 310 may determine whether the first suspicion score is below a pre-determined threshold. Although this disclosure describes determining a suspicion score exceeds a threshold in a particular manner, this disclosure contemplates determining a suspicion score exceeds a threshold in any suitable manner.

In particular embodiments, the logical entity may receive a confirmation on the calculated suspicion score from a security administrator before determining that the first suspicion score associated with the first request message exceeds the pre-determined threshold. As an example and not by way of limitation, continuing with a prior example illustrated in FIG. 3, the routing policy engine 310 may receive a confirmation on the first suspicion score calculated by the security engine 320 from a security administrator. The security administrate may act as a check on the pre-determined threshold to further improve the evaluation of request. In particular embodiments, the security administrator may be another software module that reviews the suspicion score calculated based on the first request message and its associated information. The security administrator may produce a binary decision of whether the calculated suspicion score is reliable. As another example and not by way of limitation, the security administrator may be a human who reviews the calculated suspicion score and provides a confirmation on the calculated suspicion score considering the first request message and its associated information. The routing policy engine 310 may determine that the calculated suspicion score exceeds the pre-determined threshold upon receiving a confirmation from the security administrator. Although this disclosure describes receiving a confirmation from a security administrator on the calculated suspicion score in a particular manner, this disclosure contemplates receiving a confirmation from a security administrator on the calculated suspicion score in any suitable manner.

In particular embodiments, the first suspicion score may be calculated based on one or more features associated with the first request message. The one or more features may comprise a source IP address associated with the client device, a geolocation information associated with the source IP address, traffic histories associated with the client device, a reaction time corresponding to the first request message in response to a previous message from the one or more application servers to the client device, or any suitable feature. In particular embodiments, the one or more features may further comprise Operating System (OS) platform, device memory, screen, audio, canvas, fonts, or any suitable feature. As an example and not by way of limitation, continuing with a prior example illustrated in FIG. 2, a suspicion score may increase when a message at step 210 is sent from a location in Europe while the registered address associated with the user account is in the United States. As another example and not by way of limitation, the suspicion score may increase when a source IP address of a message at step 230 is different from a source IP address of a message at step 210. As yet another example and not by way of limitation, a user may spend time to select a color and a size for an item. A suspicion score may increase if a response time for a message at step 250 is too little after sending the list of available colors and sizes for the selected item at step 240. In particular embodiments, the security engine may use any other suitable techniques known to an ordinary person in the art to calculate the suspicion score for a message from the client device. Although this disclosure describes calculating a suspicion score for a message from a client device based on features associated with the message in a particular manner, this disclosure contemplates calculating a suspicion score for a message from a client device based on features associated with the message in any suitable manner.

In particular embodiments, the first suspicion score may be calculated with a trained machine-learning model. In particular embodiments, the trained machine-learning model may be further trained with the first request message and the suspicion score that is confirmed from the security administrator. As an example and not by way of limitation, the security engine 320 may utilize a trained machine-learning model that takes features associated with a message as input and produces a score for the message by processing the features associated with the message to calculate a suspicion score for a message. When the suspicion score is confirmed by a security administrator, the features associated with the message and the suspicion score may be used for training the machine-learning model further. In particular embodiments, the trained machine-learning model may be trained with a generic dataset of normal and malicious data. As an example and not by way of limitation, the trained machine-learning model may be trained with data from a Packet Capture (pcap) file. The trained machine-learning model may be trained without expressly requiring example request messages from the particular web application. In particular embodiments, the suspicion score calculated by the machine-learning model may be reviewed and adjusted later. The features associated with the message and the adjusted suspicion score may be used for training the machine-learning model further. Although this disclosure describes calculating a suspicion score using a trained machine-learning model in a particular manner, this disclosure contemplates calculating a suspicion score using a trained machine-learning model in any suitable manner.

In particular embodiments, the security engine may execute on a device that the logical entity executes on. As an example and not by way of limitation, the routing policy engine 310 and the security engine 320 may execute on a same computing device, such as an application server hosting the web application. The routing policy engine 310 and the security engine 320 may communicate with each other using an IPC mechanism. As another example and not by way of limitation, both the routing policy engine 310 and the security engine 320 may be implemented in a single software embodiment.

In particular embodiments, the security engine may execute on a different device in the network domain from a device that the logical entity executes on. As an example and not by way of limitation, the routing policy engine 310 may execute on a first computing device while the security engine 320 may execute on a second computing device. In particular embodiments, the routing policy engine 310 may utilize API calls defined for the security engine 320 for communicating with the security engine 320. In particular embodiments, the routing policy engine 310 and the security engine 320 may use a pre-determined communication protocols for communicating with each other.

In particular embodiments, the security engine may be executed by a third-party device and may be accessible through a call to an application programming interface provided by the third-party device. As an example and not by way of limitation, the security engine 320 may be a third-party service outside the network domain 300 although FIG. 3 depict the security engine 320 within the network domain 300. The routing policy engine 310 may interact with the security engine 320 through API calls provided by the third party.

In particular embodiments, the logical entity may determine first routing policies based at least on the first suspicion score. The first routing policies may indicate a sandbox environment as the destination for the first request message. As an example and not by way of limitation, continuing with a prior example illustrated in FIG. 3, the routing policy engine 310 may determine that a suspicion score associated with a message from the browser 305 exceeds a pre-determined threshold. In response to the determination, the routing policy engine 310 may determine routing policies for the message indicating that the sandbox environment 340 is the destination for the message. As another example and not by way of limitation, the routing policy engine 310 may determine that a suspicion score associated with a message from the browser 305 is below the pre-determined threshold. In response to the determination, the routing policy engine 310 may determine routing policies for the message indicating that the online application 330 is the destination for the message. Although this disclosure describes determining routing policies for a message based on a suspicion score associated with the message in a particular manner, this disclosure contemplates determining routing policies for a message based on a suspicion score associated with the message in any suitable manner.

In particular embodiments, the sandbox environment may be configured to mimic the one or more application servers. Importantly, however, the sandbox environment may be configured not to modify the data managed by the online application or access sensitive data managed by the online application, particularly in response to requests from the browser 305. As an example and not by way of limitation, continuing with a prior example illustrated in FIG. 2, the sandbox environment may be configured to behave identically to the online application server 205 from step 210 through step 260. However, the sandbox environment is configured not to create new records or update the existing records in the database. The sandbox environment is further configured not to access the third-party service to process the credit card transaction. Although this disclosure describes configuring the sandbox environment in a particular manner, this disclosure contemplates configuring the sandbox environment in any suitable manner.

In particular embodiments, the logical entity may insert an indication into the first request message when the first suspicion score is determined to exceed the pre-determined threshold. In particular embodiments, the indication may be a tag inserted into a header of the first request message. In particular embodiments, any suitable method to add the indication into the first request message may be used. The indication may specify that the first request message is to be routed to a sandbox environment. As an example and not by way of limitation, continuing with a prior example illustrated in FIG. 3, the routing policy engine 310 may add a tag into a header of the message received from the browser 305 if the routing policy engine 310 determines that a suspicion score associated with the message exceeds the pre-determined threshold or otherwise determines that the message is to be routed to the sandbox environment 340. The added tag may indicate that the message is to be routed to the sandbox environment 340. When any intermediate device within the network domain 300 receives the message with the tag, the intermediate device may forward the message towards the sandbox environment 340. Although this disclosure describes inserting an indication into a message when a suspicion score associated with the message is determined to exceed the pre-determined threshold in a particular manner, this disclosure contemplates inserting an indication into a message when a suspicion score associated with the message is determined to exceed the pre-determined threshold in any suitable manner.

Figure 4A:
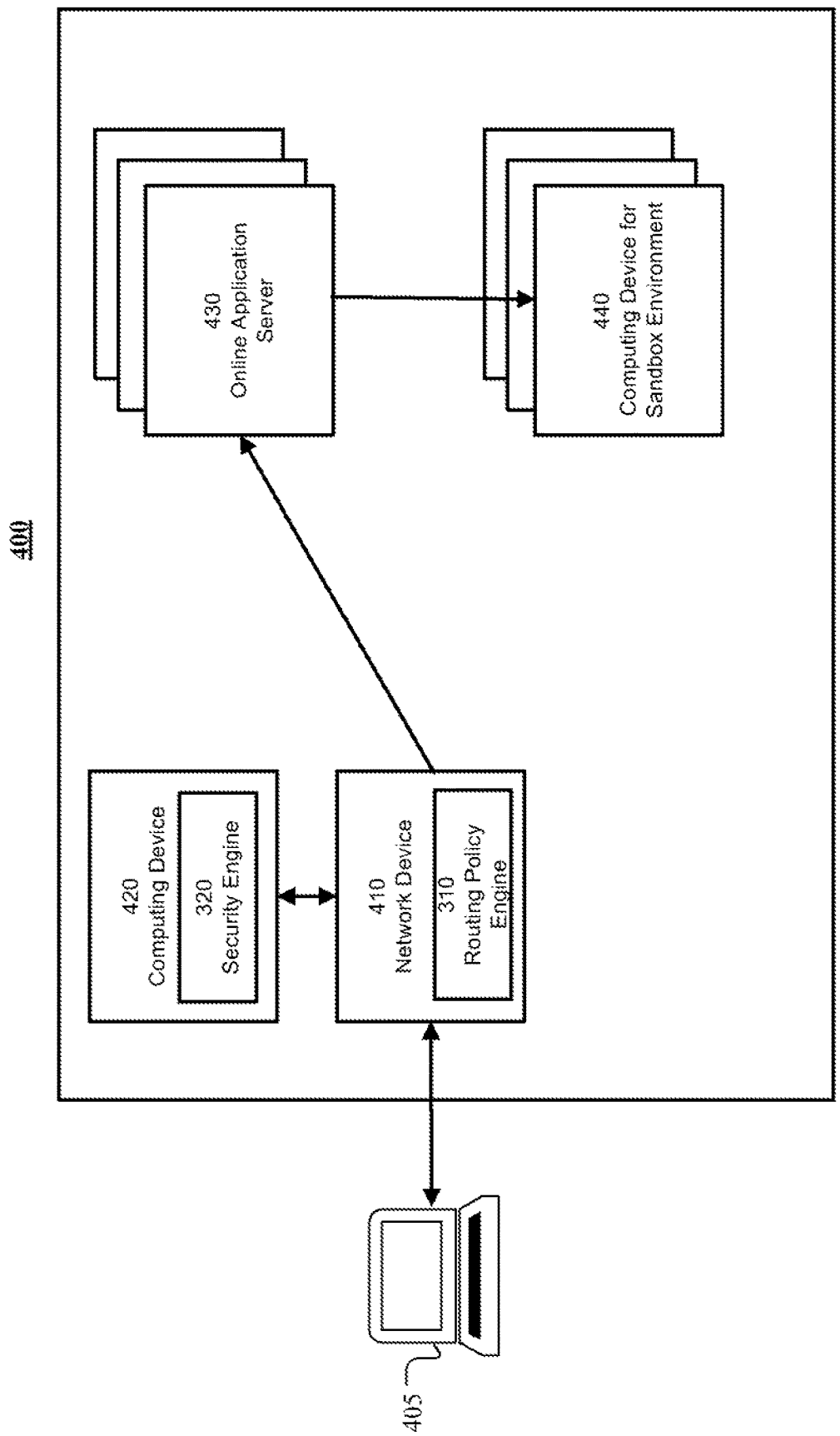
FIG. 4A illustrates a first example routing path of a suspicious message to a sandbox environment when the routing policy engine executes on a network device according to some embodiments described herein.

In particular embodiments, the logical entity may execute on a network device in the network domain. The network device may be a firewall, a gateway, a traffic load-balancer, or any suitable network device in the network domain. FIG. 4A illustrates a first example routing path of a suspicious message to a sandbox environment when the routing policy engine executes on a network device. As an example and not by way of limitation, illustrated in FIG. 4A, the routing policy engine 310 executes on a network device 410. The security engine 320 executes on a computing device 420 within the network domain 400 associated with the online application provided by one or more application servers 430. The network device 410 may be a firewall, a gateway, a traffic load-balancer, a router, or any suitable network device in the network domain 400. When the network device 410 receives a message from a client device 405, the network device 410 may process the message for its own functionalities. Then, the routing policy engine 310 within the network device 410 may receive the message. The routing policy engine 310 may evaluate a risk associated with the message. The routing policy engine 310 may determine a suspicion score for the message by communicating with the security engine 320 executing on the computing device 420. The routing policy engine 320 may determine routing policies associated with the message based on the suspicion score. Although this disclosure describes a particular deployment of the routing policy engine, this disclosure contemplates any suitable deployment of the routing policy engine.

In particular embodiments, the sandbox environment may comprise one or more computing devices. In particular embodiments, the sandbox environment may comprise one or more virtual machines. As an example and not by way of limitation, the sandbox environment is provided by one or more computing devices 440. In particular embodiments, the computing devices 440 may be virtual machines. Although this disclosure describes a particular deployment of the sandbox environment, this disclosure contemplates any suitable deployments of the sandbox environment.

In particular embodiments, the logical entity may forward the indication-inserted first request message to a first computing device in the network domain based on the first routing policies. In particular embodiments, the first computing device may be one of the one or more application servers. The one of the one or more application servers may process the first request message before forwarding the first request message to the sandbox environment. The one of the one or more application servers may determine to forward the first request message to the sandbox environment based on the indication in the first request message. As an example and not by way of limitation, continuing with a prior example illustrated in FIG. 4A, the routing policy engine 310 may add a tag to the message header when the routing policy engine 310 determines that the suspicion score for the message exceeds the pre-determined threshold. The routing policy engine 310 may forward the tag-added message to one of the one or more application servers 430. The application server 430 may determine that the message needs to be routed to one of the computing devices providing the sandbox environment 440. The application server 430 may take the required processes, if any, and forward the message to one of the computing devices providing the sandbox environment 440. Although this disclosure describes routing a message with a high suspicion score to the sandbox environment through an application server in a particular manner, this disclosure contemplates routing a message with a high suspicion score to the sandbox environment through an application server in any suitable manner.

Figure 4B:
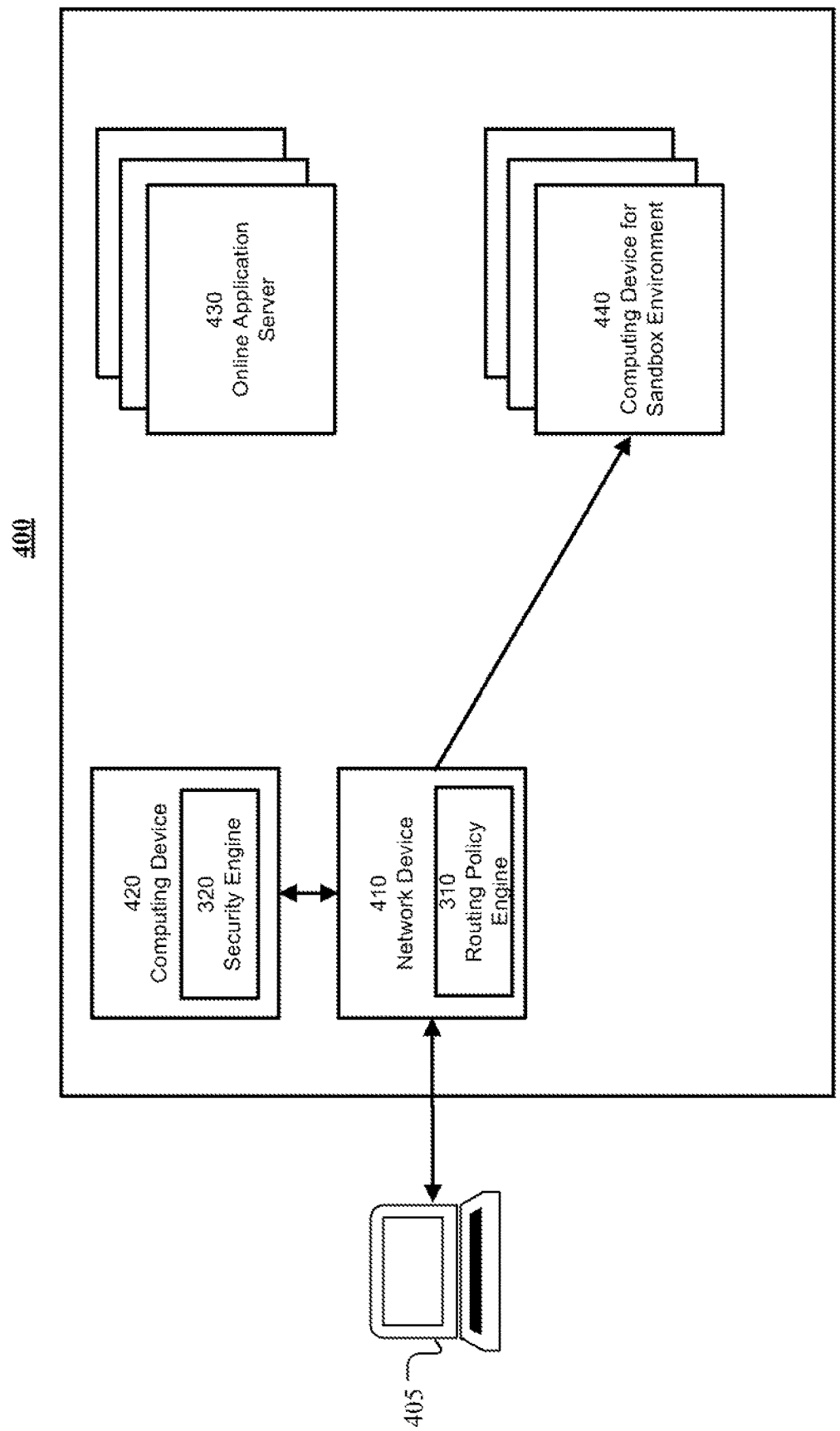
FIG. 4B illustrates a second example routing path of a suspicious message to a sandbox environment when the routing policy engine executes on a network device according to some embodiments described herein.

In particular embodiments, the logical entity may forward the indication-inserted first request message to a first computing device in the network domain based on the first routing policies. In particular embodiments, the first computing device may belong to the sandbox environment. FIG. 4B illustrates a second example routing path of a suspicious message to a sandbox environment when the routing policy engine executes on a network device. As an example and not by way of limitation, illustrated in FIG. 4B, the routing policy engine 310 may evaluate a risk associated with the message. As an example, the routing policy engine 310 determines that a suspicion score for a message received from the client device 405 exceeds the pre-determined threshold. The routing policy engine 310 determines routing policies indicating that the message is to be routed to one of the computing devices providing the sandbox environment 440. The routing policy engine 310 adds a tag to a header of the message, where the tag indicates that the message is to be routed to one of the computing devices providing the sandbox environment 440. The routing policy engine 310 forwards the message towards one of the computing devices providing the sandbox environment 440 without routing the message through one of the one or more application servers 430. Any intermediate device receiving the message may determine that the message is to be routed to one of the computing devices providing the sandbox environment 440 and forward the message to the one of the computing devices 440. As another example and not by way of limitation, the routing policy engine 310 may change the destination IP address to an IP address of one of the computing devices providing sandbox environment 440 instead of adding a tag to the header. Any intermediate device in the network domain 400 may determine that the message is to be routed to the one of the computing devices providing sandbox environment 440 based on the destination IP address. Although this disclosure describes routing a suspicious message to the sandbox environment without routing through one of the application servers in a particular manner, this disclosure contemplates routing a suspicious message to the sandbox environment without routing through one of the application servers in any suitable manner.

Figure 5:
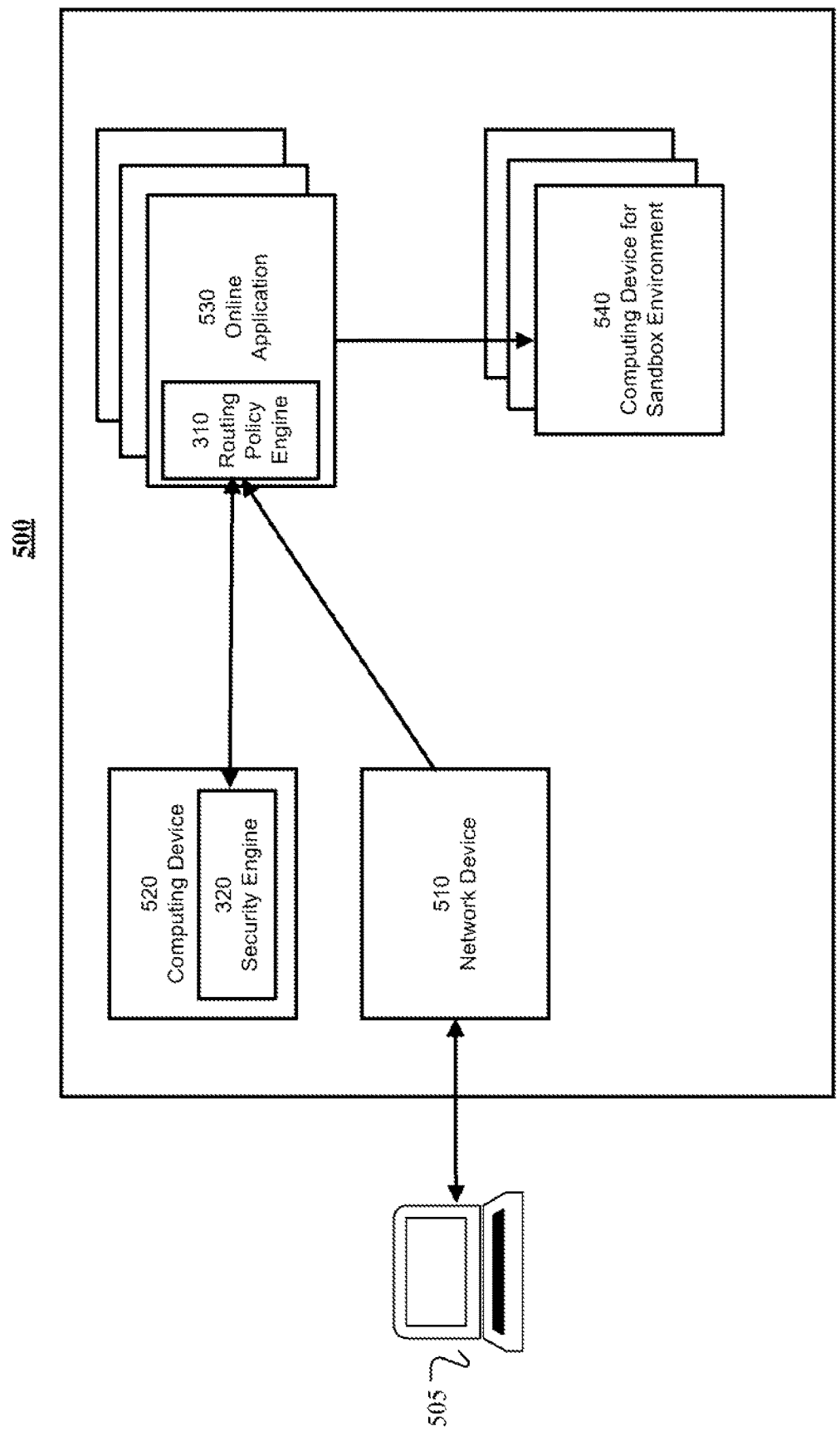
FIG. 5 illustrates an example routing path of a suspicious message to a sandbox environment when the routing policy engine executes on an application server according to some embodiments described herein.

In particular embodiments, the logical entity may execute on one or more of the application servers. FIG. 5 illustrates an example routing path of a suspicious message to a sandbox environment when the routing policy engine executes on an application server. As an example and not by way of limitation, illustrated in FIG. 5, a message from a client device 505 may be processed by one or more network devices 510. The message is routed to one of one or more application servers 530. The routing policy engine 310 executing on the application server 530 may evaluate a risk associated with the message. As an example, the routing policy engine 310 may determine a suspicion score for the message by communicating with the security engine 320 executing on a computing device 520. When the routing policy engine 310 determines that the suspicion score for the message exceeds the pre-determined threshold, the routing policy engine 310 may insert an indication to the message indicating that the message is to be routed to one of the computing devices providing the sandbox environment 540. In particular embodiments, the indication may be tag added to a header of the message. In particular embodiments, the indication may be updated destination IP address in the message. The updated destination IP address may be an IP address of one of the computing devices 540. The online application module on the application server 540 may determine that the message is to be routed to the sandbox environment based on the indication in the message. The message may be processed by the online application module, if any, before the message is forwarded to the one of the computing devices providing the sandbox environment 540. Although this disclosure describes routing a suspicious message to the sandbox environment when a logical entity executes on an application server in a particular manner, this disclosure contemplates routing a suspicious message to the sandbox environment when a logical entity executes on an application server in any suitable manner. As an example, other indications besides the destination IP address may be used to direct the message to the one of the computing devices 540.

In particular embodiments, the logical entity may receive a second request message associated with the online application from the client device. The logical entity may evaluate a risk associated with the second request message. In particular embodiments, the logical entity may determine a second suspicion score corresponding to the second request message. As an example and not by way of limitation, continuing with a prior example illustrated in FIG. 3, where the routing policy engine 310 routed the first message from the browser 305 to the sandbox environment 340 because the first suspicion score corresponding to the first message exceeds the pre-determined threshold, the routing policy engine 310 may receive a second message from the browser 305. The routing policy engine 310 may determine a second suspicion score corresponding to the second message by communicating with the security engine 320.

In particular embodiments, the logical entity may determine that a level of risk associated with the second request message is lower than the pre-determined threshold. As an example, the logical entity may determine that a second suspicion score associated with the second request message is lower than the pre-determined threshold. The logical entity may determine second routing policies based on the second suspicion score. The second routing policies may indicate that the second request message is to be routed to one of the one or more application servers. The logical entity may forward the second request message to a second computing device in the network domain based on the second routing policies. As an example and not by way of limitation, continuing with a prior example, the routing policy engine 310 may receive a confirmation from the security administrator on the second suspicion score. The routing policy engine 310 may determine second routing policies based on a fact that the second suspicion score is lower than the pre-determined threshold. The second routing policies may indicate that the second message is to be routed to one of the one or more application servers providing the online application 330. The sandbox environment 340 is configured to mimic the online application 340 as long as a data update is not performed. The second message comprises state information associated with previous interactions between the browser 305 and the sandbox environment 340. Therefore, the application server should be able to handle the second message without any interruption. The user associated with the browser may not realize that a portion of the messages have been processed by the sandbox environment 340. Although this disclosure describes routing a non-suspicious message to an application server after handing messages by the sandbox environment in a communication session in a particular manner, this disclosure contemplates routing a non-suspicious message to an application server after handing messages by the sandbox environment in a communication session in any suitable manner.

Figure 6:
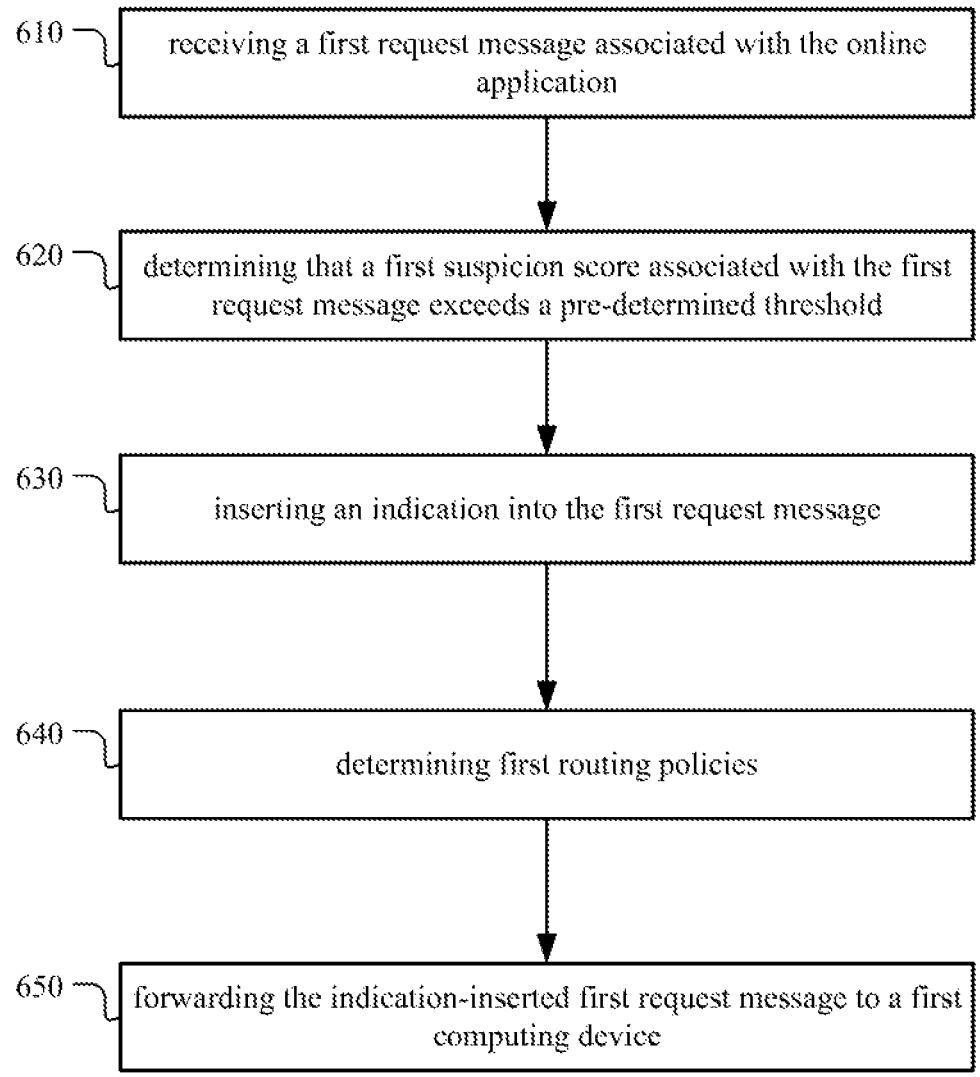
FIG. 6 illustrates an example method for rerouting a suspicious message for an online application to a sandbox environment according to some embodiments described herein.

FIG. 6 illustrates an example method 600 for rerouting a suspicious message for an online application to a sandbox environment. The method may begin at step 610, where a logical entity may receive a first request message associated with the online application from a client device. The online application may be provided by one or more application servers within a network domain associated with the online application. The online application may manage data corresponding to one or more users. At step 620, the logical entity may determine that a first suspicion score associated with the first request message exceeds a pre-determined threshold. At step 630, the logical entity may insert an indication into the first request message in response to the determination. The indication may specify that the first request message is to be routed to a sandbox environment. The sandbox environment may be configured to mimic the one or more application servers. The sandbox environment may be configured to not update the data managed by the online application. At step 640, the logical entity may determine first routing policies based at least on the first suspicion score. The first routing policies may indicate the sandbox environment as the destination for the indication-inserted first request message. At step 650, the logical entity may forward the indication-inserted first request message to a first computing device in the network domain based on the first routing policies.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for rerouting a suspicious message for an online application to a sandbox environment including the particular steps of the method of FIG. 6, this disclosure contemplates any suitable method for rerouting a suspicious message for an online application to a sandbox environment including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
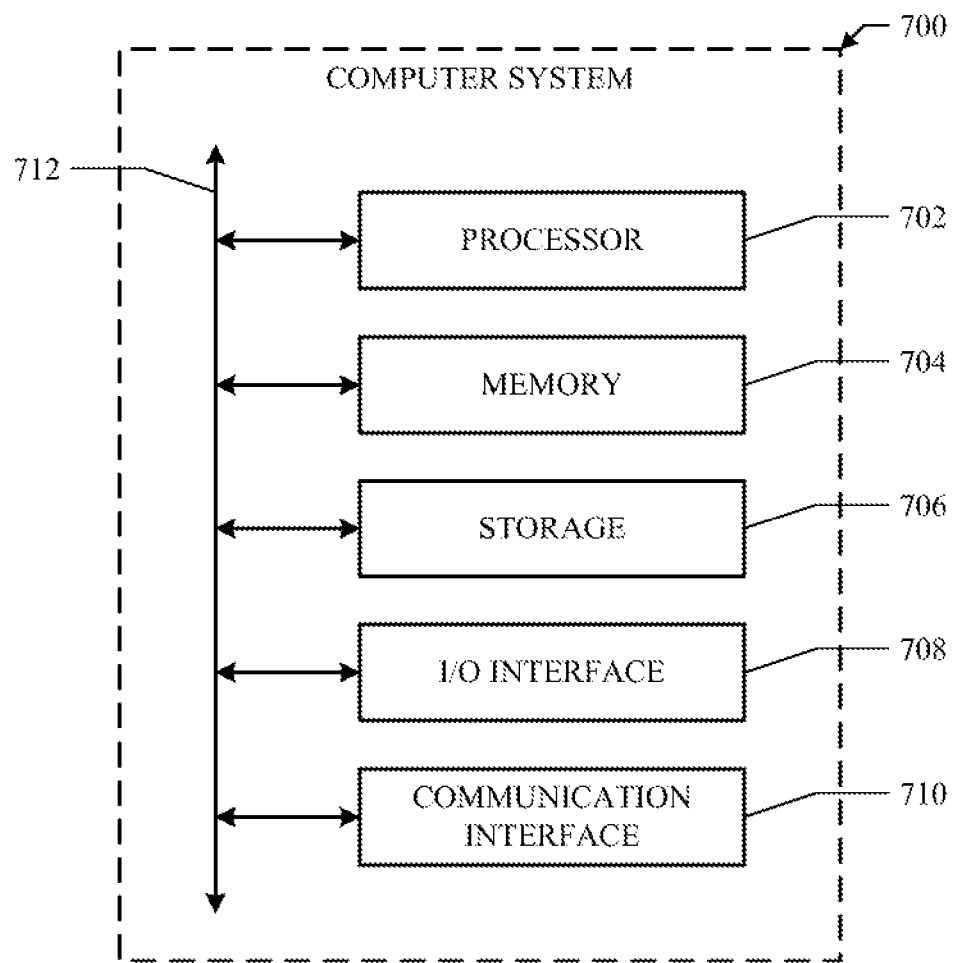
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a logical entity in a network domain associated with an online application:
   receiving a first request message associated with the online application from a client device, wherein the online application is provided by one or more application servers within the network domain, wherein the online application manages data corresponding to one or more users, and wherein the first request message is destined to one of the one or more application servers;
   determining that a first suspicion score associated with the first request message exceeds a pre-determined threshold;
   inserting into the first request message, in response to the determination, an indication configured to instruct the one of the one or more application servers to forward the first request message to a sandbox environment after processing the first request message, wherein the sandbox environment is configured to mimic the one or more application servers, and wherein the sandbox environment is configured to not update the data managed by the online application;
   determining first routing policies based at least on the first suspicion score, the first routing policies indicating that the indication-inserted first request message is to be routed to the sandbox environment through the one of the one or more application servers as a new destination for the indication-inserted first request message; and
   forwarding the indication-inserted first request message to a first computing device in the network domain based on the first routing policies.

2. The method of claim 1, wherein the logical entity executes on one or more of the application servers.

3. The method of claim 1, wherein the logical entity executes on a network device in the network domain, wherein the network device is a firewall, a gateway, or a traffic load-balancer.

4. The method of claim 1, wherein the first suspicion score is calculated based on one or more features associated with the first request message, the one or more features comprising a source IP address associated with the client device, a geolocation information associated with the source IP address, traffic histories associated with the client device, or a reaction time corresponding to the first request message in response to a previous message from the one or more application servers to the client device.

5. The method of claim 4, wherein the first suspicion score is calculated by a security engine.

6. The method of claim 5, wherein the security engine executes on a device that the logical entity executes on.

7. The method of claim 5, wherein the security engine executes on a different device in the network domain from a device that the logical entity executes on.

8. The method of claim 5, wherein the security engine is executed by a third-party device and is accessible through a call to an application programming interface provided by the third-party device.

9. The method of claim 5, wherein the first suspicion score is calculated with a trained machine-learning model.

10. The method of claim 1, wherein determining that the first suspicion score associated with the first request message exceeds the pre-determined threshold comprises receiving a confirmation on the first suspicion score from a security administrator.

11. The method of claim 1, wherein the first request message comprises state information associated with previous interactions between the one or more application servers and the client device.

12. The method of claim 1, further comprising:
receiving a second request message associated with the online application from the client device;
determining that a second suspicion score associated with the second request message is lower than the pre-determined threshold;
determining second routing policies based on the second suspicion score, the second routing policies indicating that the second request message is to be routed to one of the one or more application servers; and
forwarding the second request message to a second computing device in the network domain based on the second routing policies.

13. The method of claim 1, wherein the first computing device is one of the one or more application servers.

14. The method of claim 13, wherein the one of the one or more application servers processes the first request message before forwarding the first request message to the sandbox environment.

15. The method of claim 1, wherein the first computing device belongs to the sandbox environment.

16. The method of claim 1, wherein the indication is a tag inserted into a header of the first request message.

17. The method of claim 1, wherein the sandbox environment comprises one or more computing devices.

18. The method of claim 1, wherein the sandbox environment comprises one or more virtual machines.

19. One or more computer-readable non-transitory storage media embodying software that is operable when executed, by a logical entity in a network domain associated with an online application, to:

receive a first request message associated with the online application from a client device, wherein the online application is provided by one or more application servers within the network domain, wherein the online application manages data corresponding to one or more users, and wherein the first request message is destined to one of the one or more application servers;
determine that a first suspicion score associated with the first request message exceeds a pre-determined threshold;
insert into the first request message, in response to the determination, an indication configured to instruct the one of the one or more application servers to forward the first request message to a sandbox environment after processing the first request message, wherein the sandbox environment is configured to mimic the one or more application servers, and wherein the sandbox environment is configured to not update the data managed by the online application;
determine first routing policies based at least on the first suspicion score, the first routing policies indicating that the indication-inserted first request message is to be forwarded to the sandbox environment as a new destination for the indication-inserted first request message; and
forward the indication-inserted first request message to a first computing device in the network domain based on the first routing policies.

20. A system comprising:
one or more processors; and
one or more computer-readable non-transitory storage media coupled to one or more of the processors and comprising instructions operable when executed by one or more of the processors to cause a logical entity in a network domain associated with an online application executing on the system to:
receive a first request message associated with the online application from a client device, wherein the online application is provided by one or more application servers within the network domain, wherein the online application manages data corresponding to one or more users, and wherein the first request message is destined to one of the one or more application servers;
determine that a first suspicion score associated with the first request message exceeds a pre-determined threshold;
insert into the first request message, in response to the determination, an indication configured to instruct the one of the one or more application servers to forward the first request message to a sandbox environment after processing the first request message, wherein the sandbox environment is configured to mimic the one or more application servers, and wherein the sandbox environment is configured to not update the data managed by the online application;
determine first routing policies based at least on the first suspicion score, the first routing policies indicating that the indication-inserted first request message is to be forwarded to the sandbox environment as a new destination for the indication-inserted first request message; and
forward the indication-inserted first request message to a first computing device in the network domain based on the first routing policies.

* * * * *